(12) United States Patent
Ballan et al.

(10) Patent No.: US 10,635,201 B2
(45) Date of Patent: Apr. 28, 2020

(54) CLICKABLE KNOB FOR TOUCH SENSORS

(71) Applicant: Advanced Silicon SA, Lausanne (CH)

(72) Inventors: Hussein Ballan, St-Légier (CH); Sylvain Maréchal, Prilly (CH); Marc Pastre, Ecublens (CH)

(73) Assignee: Advanced Silicon SA, Lausanne (CH)

( * ) Notice: Subject to any disclaimer, the term of this patent is extended or adjusted under 35 U.S.C. 154(b) by 0 days.

(21) Appl. No.: 16/384,064

(22) Filed: Apr. 15, 2019

(65) Prior Publication Data

US 2020/0073487 A1    Mar. 5, 2020

(30) Foreign Application Priority Data

Aug. 30, 2018  (EP) .................................... 18191863

(51) Int. Cl.
*G06F 3/0362*     (2013.01)
*H01H 25/06*      (2006.01)
*G06F 3/0488*     (2013.01)

(52) U.S. Cl.
CPC .......... *G06F 3/0362* (2013.01); *G06F 3/0488* (2013.01); *H01H 25/065* (2013.01)

(58) Field of Classification Search
CPC ........ G06F 3/0362; G06F 3/044; G06F 3/041; G06F 3/016; G06F 3/0488; G06F 3/039; G06F 2203/04809; G06F 3/0338; G06F 3/04886; G06F 3/0416; B60K 2370/126; B60K 37/06; H01H 25/06; G05G 1/10
USPC ..................... 345/156, 184; 200/336; 341/35
See application file for complete search history.

(56) References Cited

U.S. PATENT DOCUMENTS

| | | | |
|---|---|---|---|
| 2008/0238879 A1* | 10/2008 | Jaeger | G06F 3/03545 345/173 |
| 2011/0157056 A1 | 6/2011 | Karpfinger | |
| 2011/0227841 A1 | 9/2011 | Argiro | |
| 2011/0260976 A1 | 10/2011 | Larsen et al. | |
| 2012/0328349 A1 | 12/2012 | Isaac et al. | |
| 2013/0118881 A1 | 5/2013 | Hakimiyan et al. | |
| 2013/0229339 A1* | 9/2013 | Takahata | G06F 3/016 345/156 |
| 2014/0042004 A1* | 2/2014 | Tseng | G06F 3/0488 200/336 |
| 2014/0267118 A1* | 9/2014 | Thompson | G06F 3/039 345/173 |
| 2015/0242000 A1 | 8/2015 | Dowd et al. | |

FOREIGN PATENT DOCUMENTS

| | | |
|---|---|---|
| EP | 2511807 A2 | 10/2012 |
| EP | 3144783 A1 | 3/2017 |
| EP | 3333003 A1 | 6/2018 |
| GB | 2493139 A | 1/2013 |
| WO | WO-2012/162112 A1 | 11/2012 |

OTHER PUBLICATIONS

European Search Report for EP 18191863, dated Jan. 22, 2019, 9 pages.

* cited by examiner

*Primary Examiner* — Koosha Sharifi-Tafreshi
(74) *Attorney, Agent, or Firm* — Blank Rome LLP

(57) ABSTRACT

The present invention concerns a clickable knob which can be placed on a touch sensor for providing a physical clickable knob on the touch sensor. The detection of the user input of the clickable knob, i.e. the click state and the rotation state, is detected based on a detection of corresponding click and rotation detection points of the clickable knob by touch pixels of the touch sensor.

15 Claims, 4 Drawing Sheets

CLICKABLE KNOB FOR TOUCH SENSORS

REFERENCE DATA

The present application claims the priority of European Patent Application EP20180191863, filed on Aug. 30, 2018, the content of which is incorporated here by reference.

FIELD OF THE INVENTION

The present invention concerns a clickable knob which can be placed on a touch sensor for providing a physical clickable knob on the touch sensor. The detection of the user input of the clickable knob, i.e. the click state and the rotation state, is detected based on a the detection of corresponding click and rotation detection points of the clickable knob by touch pixels of the touch sensor.

DESCRIPTION OF RELATED ART

In the state of the art, the knob comprises a click mechanism which moves the click detection point closer to the touch sensor surface, when the click mechanism is activated. This mechanism has however the disadvantage that movable click detection point is sometimes not brought close enough to the touch sensor surface such that the click is sometimes not correctly detected. WO12162112 discloses such a clickable knob.

An alternative is to avoid the mechanical click mechanism and to detect a click only, when a finger touch a defined click surface on the knob. The click surface is conductively connected to the click detection point such that a capacitive change is detected in the touch pixel under the click detection point, when the finger touches the click surface. This might provide a more reliable detection of the click. However, this has the disadvantage that the user is not able to haptically feel and/or to hear the click due to the missing click mechanism. Such a click detection technology is for example disclosed in EP2511807 or US2011227841.

It is further known to use dome-shaped springs to create a haptic feeling/event and/or an acoustic event, when the click mechanism is activated. These dome-shaped springs are used in the keys of keyboards for creating the haptic feeling and as a switch for detecting the pressed key, once the dome-shaped spring collapses. In keys for touch sensors, dome-shaped spring are used for creating the haptic feeling and as a movable detection point detected on the touch sensor surface. However, this has similar detection problems as the mechanical click mechanism described above, because the key might not be pressed well enough or each time differently to detect the pressed state with a high quality. US2011260976, US2012328349 or US2013118881 disclose such buttons.

A further disadvantage of clickable knobs for touch sensors is that the click detection point and the rotation detection point need to be large enough and distant from each other enough to be detected and distinguished from each other by the touch pixels in the touch sensor. Therefore, the clickable knobs of the state of the art are quite big.

BRIEF SUMMARY OF THE INVENTION

It is the object of the present invention to find a clickable knob for a touch sensor which improves the user feedback and increases the detection quality of the click.

By using a mechanical click mechanism in combination with a detection point fixed in the bottom surface which is conductively connected to a user surface of the knob via a switch means, when the knob is in the clicked state, the detection quality of the click is very high and the user gets a haptic and/or acoustic feedback, when knob is clicked.

The dependent claims refer to further advantageous embodiments.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
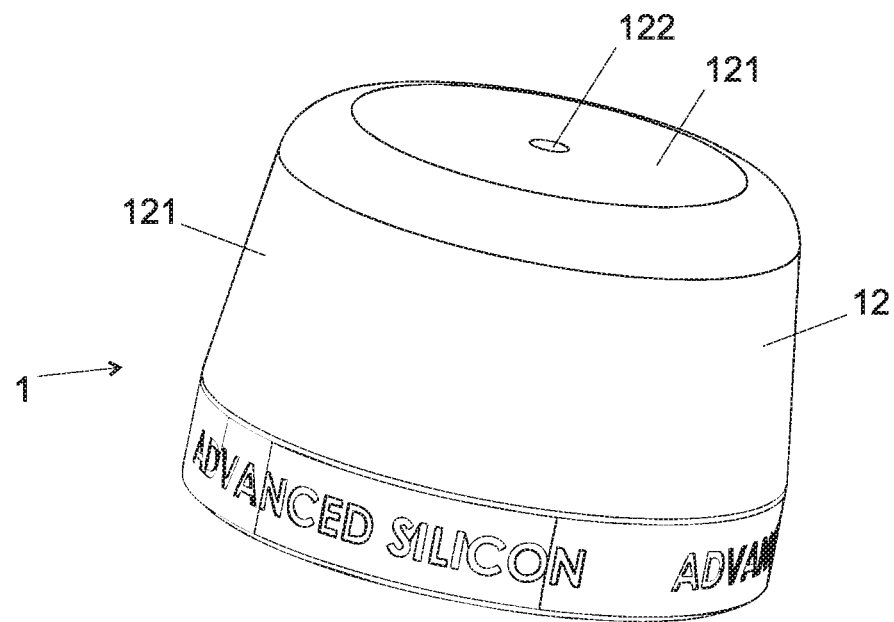
FIG. 1 shows a three-dimensional view of a first embodiment of the clickable knob.
Figure 2:
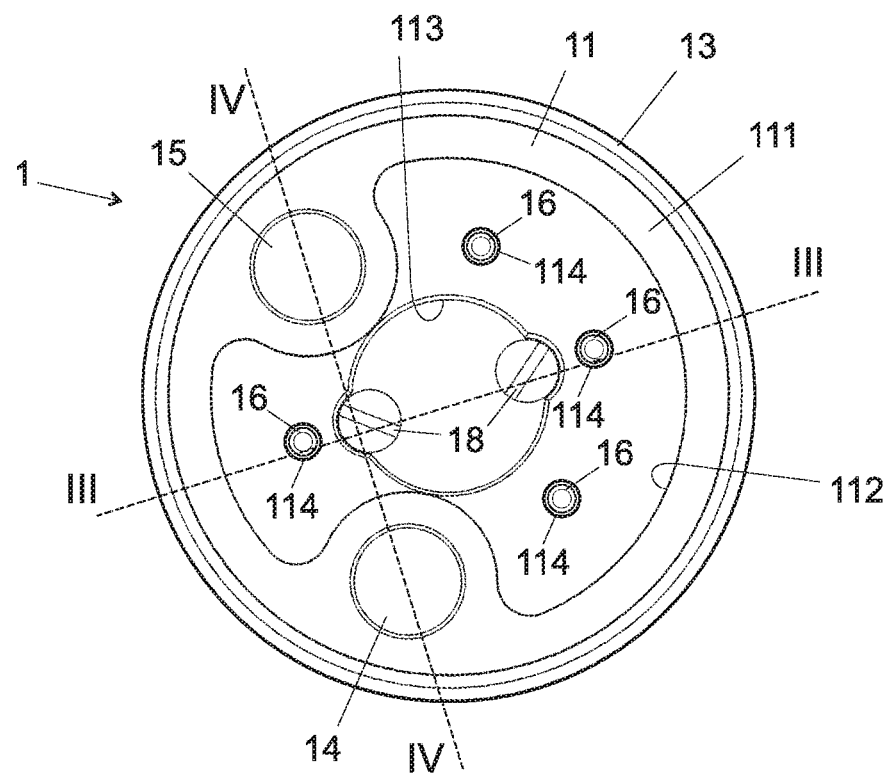
FIG. 2 shows a bottom view of the first embodiment of the clickable knob.
Figure 3:
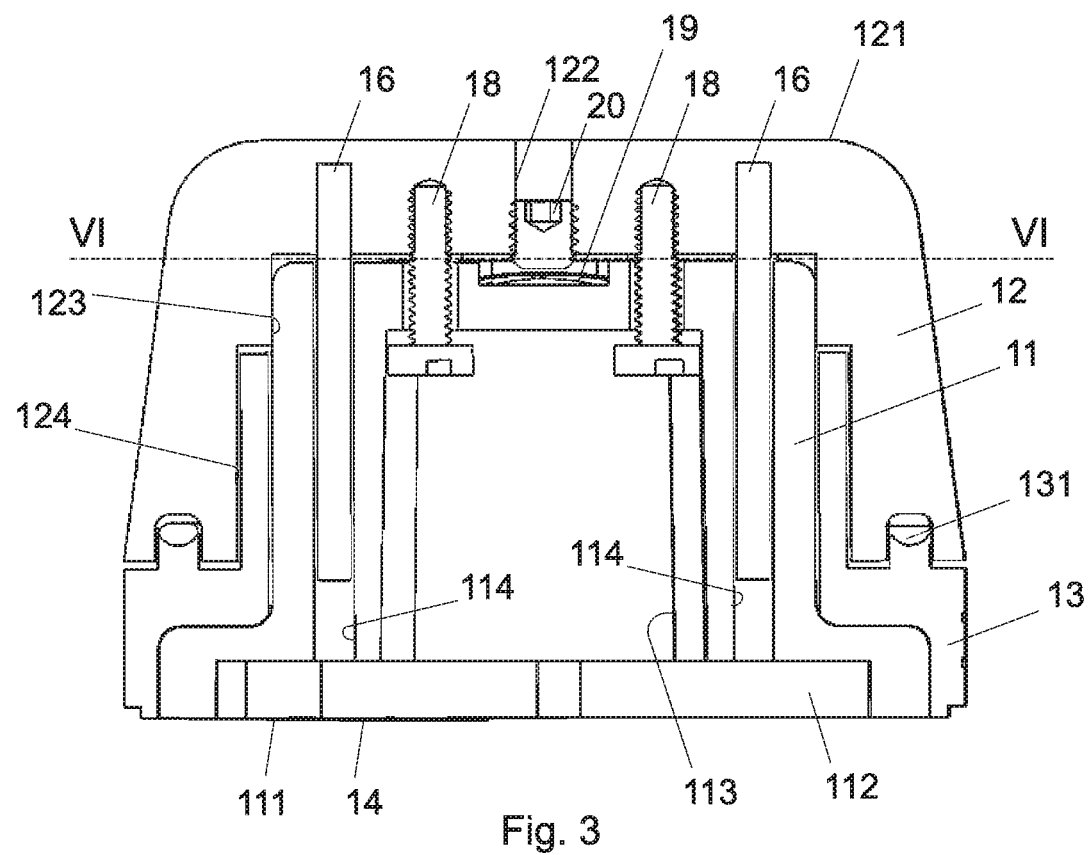
FIG. 3 shows a cross-sectional view of the first embodiment of the clickable knob along the line III-III.
Figure 4:
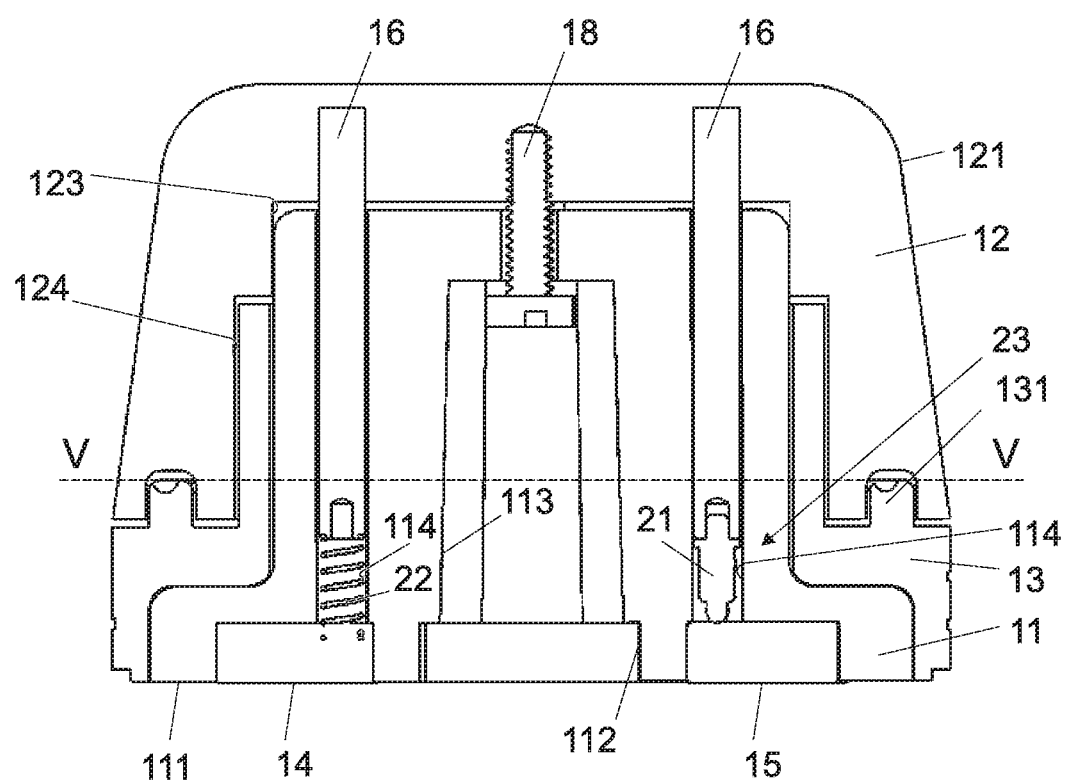
FIG. 4 shows a cross-sectional view of the first embodiment of the clickable knob along the line IV-IV.
Figure 5:
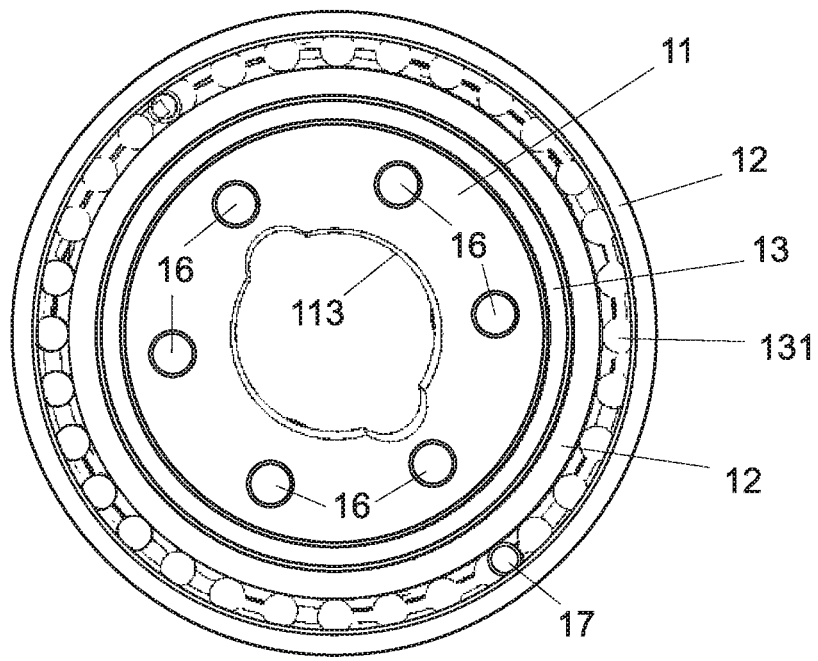
FIG. 5 shows a cross-sectional view of the first embodiment of the clickable knob along the line V-V.
Figure 6:
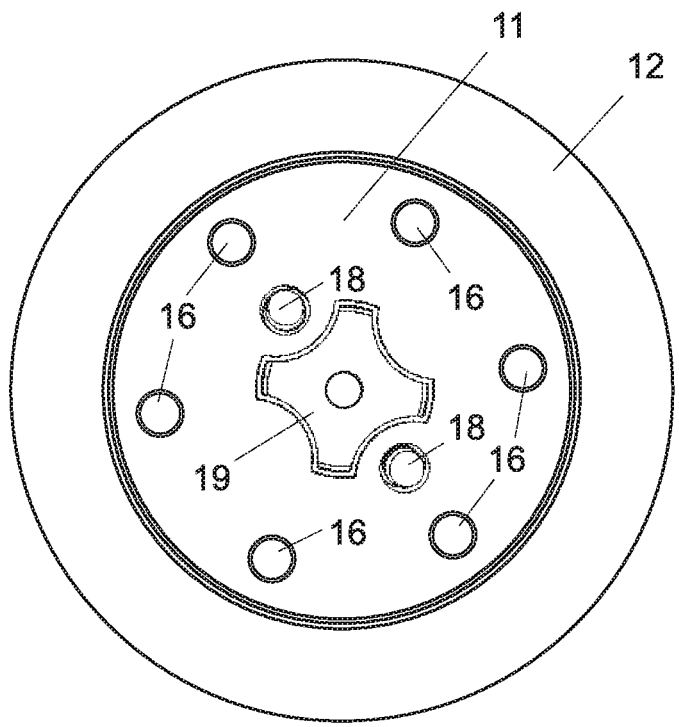
FIG. 6 shows a cross-sectional view of the first embodiment of the clickable knob along the line VI-VI.
Figure 7:
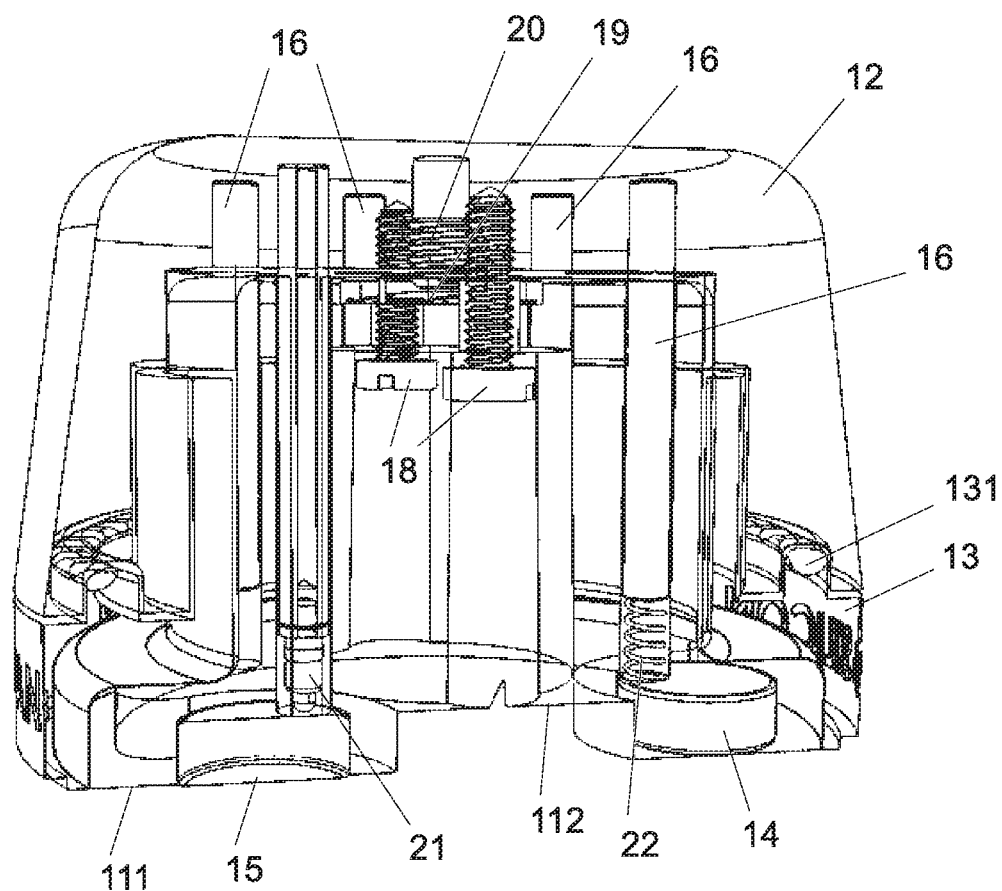
FIG. 7 shows a transparent cut-open three-dimensional view of the first embodiment.

FIGS. 1 to 7 show a first embodiment of a clickable knob according to the invention for a touch sensor. A knob is a user input device which can be rotated around knob rotation axis in order to input a rotational state of the clickable knob. In addition, the clickable knob can be mechanically activated to perform a click input. A click input is a selection or confirmation input by a user similar to a mouse click. Thus, the clickable knob 1 has a click state. The click state comprises an unclicked state and a clicked state. The clickable knob 1 is normally in an unclicked state and can be pressed by the user in a clicked state. A clickable knob for a touch sensor means that, when the clickable knob can be placed on a touch sensor surface of a touch sensor/screen, the rotational state and the click state can be detected by the touch sensor (without the necessity of an electric connection to the user input device). The clickable knob 1 in the FIGS. 1 to 7 is shown in the clicked state.

The clickable knob 1 (abbreviated in the following knob) comprises a first knob element 11 and a second knob element 12.

The first knob element 11 comprises a bottom surface 111. The bottom surface 111 is preferably flat. The bottom surface defines a bottom plane which is parallel to the touch sensor surface, when the knob 11 is placed on the touch sensor. The bottom surface 111 has preferably a diameter of larger than 30 mm, preferably than 35 mm, preferably than 40 mm. The bottom surface 111 has preferably a diameter of smaller than 70 mm, preferably than 60 mm, preferably than 50 mm. The bottom surface 111 forms preferably a circle.

The bottom surface 111 comprises a rotation detection point 14 and a click detection point 15. The detection points 14, 15 are preferably made out of a conductive material. Here the detection points 14, 15 are supported in the bottom surface 111 of the first knob element 11. However, it is also possible that the detection points 14, 15 are just coated on the bottom surface 111. The bottom surface 111 of the first knob element 11 around the detection points 14, 15 is preferably made by an electrically insulating material, i.e. a non-conductive material, and/or any other material which is not detected by the capacitive touch pixels. Preferably, the complete body of the first knob element 11 is made of the same material. The first knob element 11 can be made by molding, mold-injection, 3D printing, etc. The detection points 14, 15 have in the bottom plane preferably a detection point diameter. The detection point diameter is preferably larger than 3 mm, preferably than 4 mm, preferably than 5 mm, preferably than 6 mm. The detection point diameter is preferably smaller than 10 mm, preferably than 9 mm, preferably than 8 mm. The detection points 14, 15 have in the bottom plane preferably a circular form. The detection points 14, 15 have preferably the same form and/or the same size. The detection points 14, 15 can be for example realized as electrically conductive cylinders integrated in the first knob element 11. The detection points 14, 15 could by fixed adhesively, by press-fitting or by other methods in corresponding recesses of the body of the first knob element 11. The detection points 14, 15 have preferably a bottom surface and a top surface. The bottom surface of the detection points 14, 15 is preferably flat and/or is preferably arranged in the same plane. The plane of the bottom surface of the detection points 14, 15 corresponds substantially to the plane of the bottom surface of the first knob element 11. This includes also the embodiment shown in FIGS. 3 and 4 where the bottom surface of the detection points 14, 15 stands out a little bit from the bottom surface of the first knob element 11. This allows that the bottom surfaces of the detection points 14, 15 are always in contact with the touch sensor surface of the touch sensor (when the knob 1 is placed or mounted on the touch sensor surface). This provides always a good positioning of the click detection point 15. Preferably, the detection points 14, 15 are arranged with distance (measured from the centre points of the two detection points 14, 15) from each other of at least 15 mm, preferably at least 20 mm and/or of less than 40 mm, preferably, than 35 mm, preferably than 30 mm. Preferably, the at least two detection points 14, 15 are arranged on a (common) circle around the knob rotation axis and preferably equally distributed over the circle. Preferably, the circle has a radius of at least 8 mm, preferably at least 10 mm, preferably at least 11 mm, preferably at least 12 mm and/or of less than 25 mm, preferably, less than 20 mm, preferably less than 18 mm, preferably at least 16 mm, less than 15 mm, preferably, less than 14 mm. This allows the optimal distribution of the detection points 14, 15 on the bottom surface 111 with respect to the trade off between the distance between the detection points 14, 15 for well-distinguishing the two points 14, 15 on the touch sensor and the size of the knob 1. Preferably, the detection points 14, 15 are arranged at an angle with respect to the knob rotation axis different than 180 to distinguish the two detection points 14, 15 when the click detection point 15 is clicked. Preferably, this angel is between 90° and 170°, preferably between 100° and 140°. This allows to well distinguish the two points in the touch sensor and to have still a large distance between the two points 14, 15. This is especially advantageous, if the knob 1 comprises only two detection points 14, 15 and/or if the rotational state is detected only based on the position of the rotation detection point 14 and/or the click state is detected only based on the detection of (the appearance of) the click detection point 15 (not excluding that a click state of a further click is detected by a further click detection point).

The bottom surface 111 of the first knob element 11 and/or of the detection points 14, 15 and/or the bottom plane is preferably perpendicular to the knob rotation axis and/or to the click direction.

In one embodiment, the first knob element 11 forms a lateral surface for supporting the second knob element 12 and/or the mounting structure 13. In one embodiment, the first knob element 11 comprises preferably a top surface being opposed to and/or parallel to the bottom surface 111. In one embodiment, the first knob element 11 is formed cylindrically. The base surfaces of the cylinder correspond to the bottom surface 111 and the top surface. Preferably the cylinder has a step between a bottom portion and a top portion. Preferably, the diameter of the top surface and/or the top portion is smaller than the bottom surface and/or the bottom portion. The step surface is arranged preferably with a normal vector parallel to the click direction and/or the knob rotation axis. However, it is also possible that the first knob element 11 is (frusto)conical or has another form. Preferably, the first knob element 11 is hollow. Preferably, the hollow recess in the first knob element 11 is arranged substantially centred around the knob rotation axis. Preferably, the inner recess in the first knob element 11 corresponds roughly to a cylinder (with the cylinder axis corresponding to the knob rotation axis). Preferably, the inner recess has preferably a step with larger diameter in a bottom portion 112 and a smaller diameter in a top portion 113. The bottom portion 112 of the inner recess corresponds (with slight differences) substantially to the bottom portion of the outer surface of the first knob element 11. The bottom portion of the outer surface of the first knob element 11 is a little bit higher than the bottom portion 112 of the inner recess so that the diameter of the top portion of the outer surface can be smaller than the diameter of the bottom portion 112 of the inner recess. The inner wall of the inner recess of the bottom portion 112 protrudes preferably at two angular positions versus the centre of the knob (defined by the knob rotation axis) to hold the detection points 14 and 15.

The second knob element 12 is supported such that a rotation of the second knob element 12 causes a corresponding rotation of the first knob element 11 and that the second knob element 12 can be moved in a click direction relative to the first knob element 11 between the unclicked state and the clicked state. The click direction is preferably parallel to the knob rotation axis. Preferably, the second knob element 12 is moved in the clicked state closer to the first knob element 11 than in the unclicked state.

In one embodiment, the second knob element 12 has the form of a pot or bell. In one embodiment, the second knob element 12 has an outer top surface and an outer lateral surface. In one embodiment, the second knob element 12 is preferably hollow with an inner recess. Preferably, the form and/or diameter of a (top) portion 123 of the inner recess of the second knob element 12 corresponds to a form of a (top) portion of the outer lateral surface of the first knob element 11 such that the first knob element 11 can be inserted in the inner recess of the second knob element 12. In one embodiment, a bottom portion 124 of the inner recess of the second knob element 12 comprises a second diameter larger than the diameter of the top portion 123 of the inner recess of the second knob element 12. A step is provided between the top portion 123 and the bottom portion 124 of the inner recess of the second knob element 12. The bottom surface forms a (circular) ring around the inner recess. In one embodiment, the ring formed bottom surface comprises a ring formed guide channel for hosting/supporting a corresponding ring formed protrusion of the mounting structure 13. Preferably, first knob element 11 is inserted in the inner recess of the second knob element 12 so that the click can be activated on the outer top surface and on the outer lateral surface of the second knob element 12. However, it is also possible that the second knob element is inserted into an inner recess of the first knob element 11 such that the click can only be activated on the top surface of the second knob element 12. Other arrangements of the first and second knob element 11 and 12 are possible.

In one embodiment, the rotational coupling between the first knob element 11 and the second knob element 12 is achieved by at least one rod 16, preferably at least two rods 16. Preferably, the at least two rods are arranged on circle around the knob rotation axis and/or preferably equally distributed around the knob rotation axis. Preferably, at least two rods 16 are arranged above the two detection points 14 and 15. Preferably, the at least two rods 16 (at least the two rods 16 above the detection points 14, 15) comprise and/or are made of a conductive material such that the rods 16 can transfer electric charges from one end of the rod 16 to the other end. The rods 16 extend in a direction parallel to the knob rotation axis and/or to the click direction. The rods 16 are supported in corresponding rod recesses in the first and second knob elements 11, 12. In a preferred embodiment, the rods 16 are arranged slidable along the longitudinal axis of the recesses of the one of the first and second knob elements 11, 12. The rods 16 are supported such in the rod recesses of the first and second knob elements 11, 12 that the first and second knob elements 11, 12 can move relative to each other along the longitudinal axis of the rods 16 and/or the recesses and/or along the click direction. In a preferred embodiment, the rods 16 are fixed in the rod recesses of one of the first and second knob elements 11, 12 and are arranged slidable along the longitudinal axis of the recesses of the other one of the first and second knob elements 11, 12. In a preferred embodiment, the rods 16 (at least the two ones arranged above the detection points 14 and 15) are fixed in the rod recesses of the second knob element 12 and are arranged slidable along the longitudinal axis of the recesses 114 of the first knob elements 11. However, it would also be possible that the rods 16 are arranged slidable in both of the first and second knob elements 11, 12. At the same time, the rods 16 transfer a rotation of the second knob element 12 on the first knob element 11. Preferably, the at least two rod recesses open in the top surface of the first knob element 11 such that the rods 16 (preferably fixed in the (rod recesses of the) second knob element 12) can be inserted in the rod recesses 114 of the first knob element 11 from its top surface. Preferably, the at least two rod recesses 114 of the first knob element 11 are through holes and open in the inner recess of the first knob element 11, preferably in the step of the inner recess, or in the recess for holding the detection points 14, 15. Preferably, a first one of the rod recesses 114 of the first knob element 11 extend from the top surface of the first knob element 11 to the top surface of the rotation detection point 14. Preferably, a second one of the rod recesses 114 of the first knob element 11 extend from the top surface of the first knob element 11 to the top surface of the click detection point 15.

The knob 1 comprises preferably at least one stopper element which limits the relative movement between the first knob element 11 and the second knob element 12 in the click direction. The at least one stopper element comprises preferably a first stop limiting the relative movement of the second knob element 12 towards the first knob element 11. The first stop is here realized by the first knob element 11 and the second knob element 12 hitting on each other. When the first and the second knob element 11, 12 is in a position that their movement towards each other is stoped by the first stop, then the knob is in the clicked state. The at least one stopper element comprises preferably a second stop limiting the relative movement of the second knob element 12 away from the first knob element 11. The second stop is here realized by at least one (here two) screw 18, more precisely its head. The/each screw 18 extends through a through hole of the first knob element 11 into the second knob element 12. The through hole is arranged preferably such in the first knob element 11 that the through hole opens in the inner recess of the first knob element 11, preferably in the top portion or surface of the inner recess. The screw 18 is fixed in the second knob element 12 such that the head of the screw 18 moves with the movement of the second knob element 12 (relative to the first knob element 11). The screw 18 is arranged movably in the through hole of the first knob element 11. The through hole has a diameter larger than the screw 18, but smaller than the head of the screw 18. Thus, the head of the screw limits the movement of the second knob element 12 away from the first knob element 11. Here, the second stop is realized by two screws 18 arranged around the knob rotation axis. The at least one screw 18 and/or the through hole of the first knob element 11 extend preferably parallel to the click direction and/or to the knob rotation axis. When the first and the second knob element 11, 12 is in a position that their movement away from each other is stopped by the second stop, then the knob is in the unclicked state.

In one embodiment, the knob 1 comprises spring means. The spring means is configured to force the knob 1 in the unclicked state and/or to force the second knob element 12 away from the first knob element 11. The spring means is preferably arranged between the second knob element 12 and the first knob element 11. In a preferred embodiment, the spring means is configured to have a nonlinear force curve over the compression length or the distance between the first knob element 11 and the second knob element 12 in the click direction and/or to have a haptic and/or acoustic feedback. In a preferred embodiment, the spring means is configured to have in the unclicked state a first resistance and have a second resistance being longer than the first resistance, when the first knob element 11 is moved from the unclicked state a predetermined distance towards the second knob element 12. This creates said haptic and/or acoustic feedback, when bringing the knob 1 from the unclicked state in the clicked state (and eventually also when bringing the knob 1 from the clicked state in the unclicked state). Preferably, the spring means comprises a dome-shaped spring 19 which collapses after a certain pressure threshold has been reached. This dome-shaped spring 19 is the preferred embodiment of the spring means described above. However, other or additional springs could be used as spring means. In one embodiment, the dome-shaped spring 19 is arranged such that the knob rotation axis goes through the center of the dome-shaped spring 19 and/or such that the pressure force acts in the click direction. In one embodiment, the dome-shaped spring 19 is arranged in a spring recess in the (outer) top surface of the first knob element 11. The spring recess is preferably so deeper than the height of the spring 19 such that the spring 19 does not protrude from the (outer) top surface of the first knob element 11. The second knob element 12 has preferably a protrusion at the (inner) top surface of the inner recess. This protrusion is pressed by the dome-shaped spring 19 into the unclicked state. The protrusion is here realized by the screw 20 extending through the threaded through hole 122.

The second knob element 12 comprises a user surface 121 which is configured to be touched by a user for rotating and/or clicking the knob 1. The user surface 121 is electrically conductive. This means that at least a part, preferably the complete user surface 121 is electrically conductive. Preferably, the body of the second knob element 12 is made of an electrically conductive material. The conductive material could be a metal or also a composite material, e.g. an insulating matrix comprising conductive particles or fibres. Such a composite material would allow to use materials which have a better grip than metal materials, e.g. by using an elastomer as an insulating matrix. However, the conductivity of the user surface 121 can also be obtained by a coating or other measures.

The user surface 121 is permanently conductively connected to the rotation detection point 14 such that the capacity of a finger or a user touching the user surface 121 is transferred to the rotation detection point 14 on the bottom surface 111 of the first knob element 11. This allows the touch sensor to detect the (position of the) rotation detection point 14 based on the capacitance changed by the touch of the finger of the user. In one embodiment, the permanent conductive connection between the user surface 121 and the rotation detection point 14 is achieved via the rod 16 (arranged above the rotation detection point 14). The top end of the rod 16 ends in the second knob element 12, where it is connected with the user surface 121 (e.g. by the conductive material of the second knob element 12). The bottom end of this rod 16 is connected to the (top surface of the) rotation detection point 14 by a connection means 22 configured to maintain this conductive connection in each click state of the knob 1 and/or in each position of the rod 16 in the click direction. This connection means 22 is here realized by a helical spring. This helical spring could further be part of the spring means described above. However, preferably its spring force is neglectable compared to the dome-shaped spring 19 such that in the preferred embodiment, it is rather not considered as part of the spring means.

The user surface 121 is conductively connected to the click detection point 15, when the knob 1 is in the clicked state, and disconnected from the click detection point 15, when the knob 1 is in the unclicked state. The knob 1, preferably the first knob element 11 comprises a switch means 23 for conductively connecting the user surface 121 and the click detection point 15 in the clicked state and for conductively disconnecting the user surface 121 and the click detection point 15 in the unclicked state. Thus, the capacity of a finger or a user touching the user surface 121 is transferred to the click detection point 15 on the bottom surface 111 of the first knob element 11, (only) when the knob 1 is in the clicked state. This allows the touch sensor to detect the (appearance of the) click detection point 15 based on the sudden capacitance changed caused by closing the switch means 23 and conducting the charges from the finger to the click detection point 15. In one embodiment, the permanent conductive connection between the user surface 121 and the rotation detection point 14 is achieved via the rod 16 (arranged above the click detection point 15). The top end of the rod 16 ends in the second knob element 12, where it is connected with the user surface 121 (e.g. by the conductive material of the second knob element 12). The bottom end of this rod 16 is connected to the (top surface of the) click detection point 15 via said switch means 23. This switch means 23 is here realized by an extension element 21 which touches (and thus electrically connects) the (top surface of the) click detection point 15, when the knob 1 is in the clicked state and/or when the second knob element 12 is moved towards the first knob element 11, and which does not touch (and thus electrically disconnects) the (top surface of the) click detection point 15, when the knob 1 is in the unclicked state and/or when the second knob element 12 is moved away from the first knob element 11. This switch means 23 has the advantage that the click detection point 15 remains in a well defined position over the touch sensor such that the click detection point 15 can be detected with a very high detection quality once the switch means 23 is in the connected state. The switch means 23 described here is just one example. The switch means 23 can also be arranged at different places in the knob 1 along the conductive line between the user surface 121 and the click detection point 15.

The knob 1 comprises preferably further a mounting structure 13. The mounting structure 13 is configured to mount the knob 1 on a touch sensor surface of the touch sensor. Preferably, the mounting structure 13 allows to mount the knob 1 in a fixed manner on the touch sensor surface. The mounting structure 13 supports the connected first knob element 11 and second knob element 12 such that the connected first knob element 11 and second knob element 12 can rotate around the knob rotation axis and/or that the first knob element 11 and the second knob element 12 can move relative to each other in the click direction. In one embodiment, the mounting structure forms an outer lateral surface for supporting the second knob element 12 and/or the touch sensor. Preferably, the outer lateral surface comprise a bottom portion (e.g. for being supported in the touch sensor) and top portion for supporting (the inner recess of) the second knob element 12. The top portion has preferably a smaller diameter than the bottom portion. The diameter of the bottom portion of the outer surface of the mounting structure 13 (at its top end) corresponds preferably substantially to the diameter of the top portion of the outer surface of the second knob element 12 (at its bottom end). The diameter of the top portion of the outer surface of the mounting structure 13 corresponds preferably substantially to the diameter of the bottom portion 124 of the inner surface of the second knob element 12. In one embodiment, the mounting structure 13 has an inner recess. The inner recess has preferably the form of a (stepped) cylinder. The inner recess has a bottom portion and a top portion. The bottom portion is preferably configured to support the (bottom portion of the outer surface of the) first knob element 11. The top portion is preferably configured to support the (top portion of the outer surface of the) first knob element 11. The form of the inner recess (in the top and/or bottom portion) is preferably circular. The diameter and/or the form of the bottom portion of the inner recess of the mounting structure 13 corresponds preferably substantially to the diameter and/or form of the bottom portion of the outer surface of the first knob element 11. The diameter and/or the form of the top portion of the inner recess of the mounting structure 13 corresponds preferably substantially to the diameter and/or form of the top portion of the outer surface of the first knob element 11. In one embodiment, the mounting structure 13 has substantially the form of a hollow cylinder (with the cylinder axis being the knob rotation axis). In one embodiment, the (top portion of the) mounting structure 13 is arranged between the (bottom portion 124 of the inner recess of the) second knob element 12 and the (top portion of the outer surface of the) first knob element 11. In one embodiment, there is a step between the bottom and top portion of the outer surface of the mounting structure 13. This step supports preferably the ring formed bottom surface of the second knob element 12. This step comprises preferably a ring formed protrusion 131 inserted in the ring formed the guide channel of the second knob element 12. The ring formed protrusion 131 and/or the ring formed channel comprise preferably substantially semi-spheric recesses distributed over the ring form. At least one ball is arranged between the ring formed protrusion 131 and the ring formed channel such that a rotation of the first and second knob element 11, 12 in the mounting structure 13 creates a haptic and/or acoustic feedback and/or that discrete rotational states are created. The number of semispheric recesses corresponds to the number of rotational states the knob 1 can have. Preferably, the mounting structure 13 supports the (bottom and/or top portion of the outer surface of the) first knob element 11 and/or the (bottom top portion 124 of the inner recess of the) second knob element 12 rotatably around the knob rotation axis. The (step in the inner recess of the) mounting structure 13 prevents that the first knob element 11 can be moved away from the touch sensor surface (in the click direction), when the mounting structure 13 is fixed on the touch sensor. The (top portion of the outer surface of the) mounting structure 13 guides the (bottom portion of the inner recess of the) second knob element 12 in the click direction. The first stop can be provided alternatively or in addition by the (top surface and/or the step of the) mounting structure 13.

The mounting structure 13 is however optional. The first knob element 11 can also be supported by a mounting structure of the touch sensor (such that the knob rotation axis is arranged in a fixed manner on the touch sensor surface). It is further possible to place the knob 1 freely on the touch sensor surface such that the position of the knob rotation axis can be moved on the touch sensor surface. However, in this case at least one more detection point is necessary for detecting the rotational state of the knob in the unclicked state.

The described embodiment has however the disadvantage that the synchronisation of the switch moment of the switch means 23 with the moment, when the dome-shaped spring 19 collapses is mechanically very difficult. Therefore in a further advantageous embodiment it is proposed to realise the switch means by the dome shaped spring 19. Thus, the spring means and the switch means are realized by the same dome-shaped spring 19. This has first the advantage that the haptic and/or acoustic feedback and the spring function and the switch function are realized by only one element. This reduces the complexity of the knob 1. In addition, this allows to precisely synchronize the conductive connection of the user surface 121 and the click detection point 15 with the moment, when the dome-shaped spring collapses.

Figure 8:
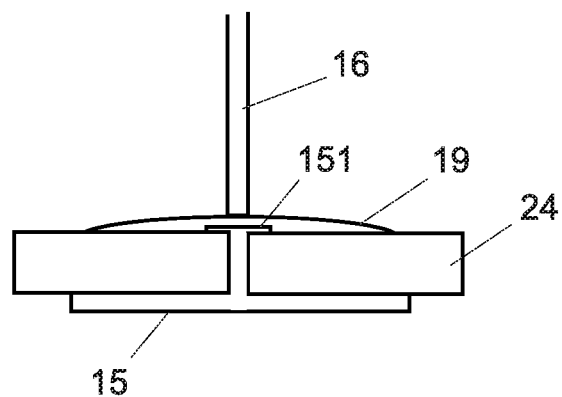
FIG. 8 shows the switch means of a second embodiment of a clickable knob.

FIG. 8 shows an embodiment of arranging such a dome-shaped spring acting as spring means and switch means. The dome-shaped spring 19 is arranged between the click detection point 15 and the (bottom end of the) rod 16. Preferably the bottom end of the rod 16 is connected to the centre of the dome-shaped spring 19. If the user clicks, the second knob element 12 and thus the rod 16 moved against the force of the dome-shaped spring 19 towards the first knob element 11 until the dome-shaped spring 19 collapses. When the dome-shaped spring 19 collapses it contacts a contact point 151 connected with the detection point 15. Otherwise, the rod 16 is not connected with the click detection point 15. Like this, the switch is always synchronized with the haptic and/or acoustic click event created when the dome-shaped spring 19 collapses. The dome-shaped spring 19 is normally made of a metal, thus conductive material. Thus, the support of the dome-shaped spring 19 should be on a non-conductive material 24 or more general a material not conductively connected to the detection point 15. In an advantageous embodiment, this can be realized by a printed circuit board (PCB) made out of an electrically insulating substrate 23. The PCB has on its top side (towards the dome-shaped spring) a contact point 151 arranged under the centre of the dome-shaped spring 19 and/or under the rod 16 (and not conductively connected to the support surface of the dome-shaped spring 19). The PCB has on its bottom side (towards the touch sensor) the detection point 15 which is conductively connected with the contact point 151 by a through hole.

The knob 1 is used normally in a system comprising the knob 1 and a touch sensor (not shown).

The touch sensor is a capacitive touch sensor and is well known to a person skilled in the art. Nevertheless, the basic functions of the touch sensor is roughly described in the following.

The touch sensor comprises a (preferably flat) touch sensor surface and is configured to detect on the touch sensor surface the position of a touch or contact of an object like a finger, a pen or of detection points of a touch interactor like the clickable knob 1. A touch or a contact can be a physical contact of the object with the touch sensor surface or the presence of the object in the close vicinity of the touch sensor surface in which the presence of the object can be measured in the physical parameter measured (often called "hovering"). In one embodiment, the touch sensor is a touch screen, and the touch sensor surface corresponds or overlaps (at least partly, preferably completely) with a display surface of a display or screen so that information of a computer or processor can be displayed through the touch sensor surface. Preferably, the display surface comprises a plurality of display pixels distributed over the display surface. The touch sensor 1 is a capacitive touch sensor and is configured to detect the touch of an object on the basis of the change of a capacitance detected on the touch sensor surface.

In one embodiment, the touch sensor (surface) comprises a plurality of touch pixels distributed over the touch sensor surface. Each touch pixel is configured to detect a capacitance from which a touch of an object or a detection point at or around the touch pixel can be determined. The touch pixels are preferably arranged in an array of first lines (in a first direction) and second lines (in a second direction, preferably perpendicular to the first direction). Each touch pixel can be identified by the corresponding first and second line. In one embodiment, the measurement of the capacitance value at the touch pixels of a line is measured line after line, thus sequentially, i.e. in subsequent distinct time windows of one sampling period. Once the detection of a touch of an object has been performed for all touch pixels, all first lines and/or all second lines, a touch frame of the measurements of all touch pixels within one sampling period is created to detect the presence and/or position of an object on the touch sensor surface.

The touch sensor comprises a detection section connected with the touch sensor surface and configured to detect the position of a touch or contact of an object like a finger, a pen or the detection point(s) of a touch interactor on the touch sensor surface.

The detection section comprises a passive detection section for passively detecting positions of a passive object on the touch sensor surface. In one embodiment, a passive detection can be achieved by applying a driving signal on the touch pixels of a first line and by measuring (sequentially or at the same time) the outputs of the second lines. The output of the second lines changes, where an object like a finger or a metallic object is present at the touch pixel(s) at the intersection(s) of the driven first line and the measured second line. The measurements of the output of the second lines for the subsequent application of the driving signal in each first line can be collected in a passive touch frame. The passive touch frame can be used as basis for detecting the presence of a passive object or a passive detection point. Therefore, the passive detection section comprises preferably a driving circuit and a sensing circuit. The driving circuit is connected with the first lines for sequentially applying a driving signal at the first lines. The sensing circuit is connected with the second lines for measuring for each driven first line the output of all second lines. Preferably, the sensing circuit comprises at least one charge sensor and at least one digital to analogue converter.

In one embodiment, the detection section can comprises also an active detection section for detecting a position of an active object on the basis of an active signal transmitted from the active object. However, the active detection section is not relevant for the present invention.

The knob 1 is placed such on the touch sensor surface that the bottom surface of the first knob element 11 faces towards the touch sensor surface and the detection points 14 and 15 (and their positions) can be detected in the touch sensor, when the user touches the user surface and/or the user clicks the knob. Preferably, the knob 1 is fixed with the mounting structure on the touch sensor in a fixed manner, i.e. such that the knob rotation axis remains fixed on the touch sensor surface. Therefore, the detection points 14 and 15 can be only on a circle around the knob rotation axis.

The system can comprises further a processor for detecting a user input by the knob 1 placed on the touch sensor surface based on the output of the passive detection section, i.e. the passive touch sampling frame. The processor could be one general component combining several different functionalities and/or could comprise distinct specific components with distinct functionalities. The processor can be arranged in the same device as the touch sensor. However, it is also possible that the processor is in another device connected to the touch sensor. The detected user input comprises the rotational state of the knob 1 and the click state of the knob 1.

The rotational state is detected based on the rotation detection point 14. If the knob is mounted on the touch sensor surface in a fixed manner, one position of the rotation detection point 14 on the touch sensor surface is enough to detect the orientation or rotational state of the knob, because the rotation detection point 14 can only be moved on the circle around the fixed knob rotation axis. The rotational state can always be detected, when the user touches the knob 1. The permanent conductive connection between the rotation detection point 14 and the user surface 121 of the knob 1 causes a change of the capacitance, when the user touches the user surface. When the user does not touch the user surface 121 of the knob 1, the rotation detection point 14 is not detectable. If the knob 1 is not mounted in a fixed manner, additional rotation detection points are necessary to determine the orientation or rotational state of the knob 1 which however increases the size of the knob 1. Therefore, it is preferred to have only one rotation detection point 14 and/or to detect the rotational state only on the basis of one single rotation detection point 14.

The click state is detected based on the click detection point 15. If the click detection point 15 is detected (in addition to the rotation detection point 15), it is detected that the click state is in the clicked state. Otherwise, i.e. if no detection point 14, 15 or only the rotation detection point 14 is detected, the processor determines that the click state is in the unclicked state.

In the unclicked state, only the rotation detection point 14 is detected in the touch sensor. In the clicked state, the rotation detection point 14 and the click detection point 15 are detected in the touch sensor and/or in the touch frame and/or in the processor. The two points 14 and 15 and/or their respective positions can be distinguished in the preferred embodiment by the known angular distance between the two points 14 and 15 which is unequal 180°. However, it is also possible to distinguish the two points by a temporal tracking of the rotation detection point 14. When there are both points 14 and 15 detected, the rotation detection point 14 is determined based on the position of the rotation detection point 14 in the previous touch sampling step(s) and/or in the previous touch frame(s).

The invention claimed is:

1. Clickable knob configured to be placed on a touch sensor surface of a touch sensor and to allow the touch sensor to detect a rotational state of the clickable knob and a click state, wherein the click state comprises a clicked state and an unclicked state, the knob comprising:

a first knob element comprising a bottom surface configured to face the touch sensor surface, when placed on the touch sensor surface for the detection of the rotational state and the click state, wherein the bottom surface of the first knob element comprises a rotation detection point allowing the detection of the rotational state of the knob in the touch sensor and a click detection point allowing the detection of the click state of the knob in the touch sensor, and a second knob element supported such that a rotation of the second knob element causes a corresponding rotation of the first knob element and that the second knob element can be moved in a click direction relative to the first knob element between the unclicked state and the clicked state, wherein the second knob element in the clicked state is moved closer to the first knob element than in the unclicked state, wherein the second knob element comprises a user surface which is configured to be touched by a user for rotating and/or clicking the knob, wherein the user surface is conductively connected to the rotation detection point;

a spring means arranged such between the first knob element and the second knob element that the knob is maintained in the unclicked state and such that a force of the spring means acts against a force of the user, when the user moves the second knob element towards the first knob element;

wherein the user surface is conductively connected to the click detection point over a switch means, wherein the switch means conductively connects the user surface with the click detection point, when the knob is in the clicked state and/or when the second knob element is moved towards the first knob element, and conductively separates the user surface from the click detection point, when the knob is in the unclicked state.

2. Clickable knob according to claim 1, wherein the spring means comprises a dome-shaped spring configured to collapse, when the second knob element is pressed towards the first knob element with a predetermined force, to create a haptic and/or acoustic click feedback, when the click state changes from the unclicked state in the clicked state and/or vice versa.

3. Clickable knob according to claim 2, wherein the switch means is realized by the dome-shaped spring.

4. Clickable knob according to claim 3, wherein the dome-shaped spring is conductively connected with the user surface, wherein a contact point under the dome-shaped spring is conductively connected with the click detection point, wherein the dome-shaped spring in the collapsed state contacts the contact point and creates a conductive connection between the user surface and the click detection point.

5. Clickable knob according to claim 1, wherein the click detection point and the rotation detection point are arranged in a fixed way in the bottom surface.

6. Clickable knob according claim 1, wherein the click detection point and the rotation detection point are both arranged in the bottom surface of the first knob element with the same distance from a knob rotation axis of the knob.

7. Clickable knob according to claim 6, wherein the click detection point and the rotation detection point are arranged substantially at the outer circumference of the bottom surface of the first knob element.

8. Clickable knob according to claim 6, wherein the click detection point and the rotation detection point enclose with respect to the rotational axis of the knob an angle between 90° and 170°, preferably between 100° and 140°.

9. Clickable knob according to claim 1, comprising only one click detection point and/or only one rotation detection point.

10. Clickable knob according to claim 1, comprising at least two connection rods extending from the first knob element to the second knob element and rotatively coupling the first knob element and the second knob element, wherein the at least two connection rods are supported in a fixed manner in the second knob element and in a movable manner in corresponding guide recesses in the first knob element such that the at least two connection rods can move in the click direction, when the second knob element is moved relative to the first knob element in the click direction.

11. Clickable knob according to claim 10, wherein the at least two connection rods comprise a click connection rod which is connected over the switch means to the click detection point and/or a rotation connection rod which is connected permanently to the rotation detection point.

12. Clickable knob according to claim 1, comprising a mounting structure configured to be mounted on the touch sensor surface of the touch sensor, wherein the first knob element and/or the second knob element is/are supported rotatably around a knob rotation axis in the mounting structure.

13. System comprising a capacitive touch sensor and a clickable knob according to claim 1, wherein the capacitive touch sensor comprises a touch sensor surface, wherein the clickable knob is placed with the bottom surface of the first knob element on the touch sensor surface, wherein the touch sensor surface comprises a plurality of touch pixels distributed over the touch sensor surface, wherein each touch pixel accessible to a user is configured to capacitively detect a finger of the user in the vicinity of the touch pixel, wherein at least one of the touch pixels which is arranged under the rotation detection point is configured to capacitively detect a touch of the finger of the user on the user surface, wherein at least one of the touch pixels which is arranged under the click detection point is configured to capacitively detect a touch of the finger of the user on the user surface, when the clickable knob is in the clicked state and the user surface is conductively connected with the click detection point.

14. System according to claim 13, comprising a processing means configured to detect the rotational state of the clickable knob based on the position on the touch sensor surface of the at least one touch pixel having detected the rotation detection point and is configured to detect the clicked state, when the click detection point is detected in at least one of said touch pixels.

15. System according to claim 13, wherein the clickable knob is mounted in a fixed manner on the touch sensor surface such that the knob rotation axis is fixed with respect to the touch sensor.

* * * * *